United States Patent [19]

Otsuka et al.

[11] Patent Number: 4,957,468

[45] Date of Patent: Sep. 18, 1990

[54] HYDRAULIC REACTION FORCE APPARATUS OF POWER STEERING DEVICE

[75] Inventors: Shigeru Otsuka; Hiroshi Ohsaki, both of Higashimatsuyama, Japan

[73] Assignee: Jidosha Kiki Co., Ltd., Tokyo, Japan

[21] Appl. No.: 256,884

[22] Filed: Oct. 12, 1988

Related U.S. Application Data

[63] Continuation of Ser. No. 62,008, Jun. 12, 1987, abandoned.

[30] Foreign Application Priority Data

Jun. 19, 1986 [JP] Japan ................... 61-141291

[51] Int. Cl.$^5$ ............................ F16D 3/80; B62D 5/06
[52] U.S. Cl. ................................. 464/27; 180/141; 464/2; 464/97
[58] Field of Search ................. 464/2, 24, 27, 83, 85, 464/97; 180/141; 280/710, 721

[56] References Cited

U.S. PATENT DOCUMENTS

| | | | |
|---|---|---|---|
| 3,136,143 | 6/1964 | Leavell | 464/27 |
| 3,837,182 | 9/1974 | Kulhavy | 464/27 |
| 4,586,581 | 5/1986 | Shibahata et al. | 180/141 X |
| 4,593,783 | 6/1986 | Honaga et al. | 180/141 |

FOREIGN PATENT DOCUMENTS

| | | | |
|---|---|---|---|
| 528088 | 11/1921 | France | 464/85 |
| 183350 | 10/1983 | Japan | 464/27 |
| 861782 | 9/1981 | U.S.S.R. | 464/27 |
| 808525 | 2/1959 | United Kingdom | 464/85 |
| 954694 | 4/1964 | United Kingdom | 464/27 |

OTHER PUBLICATIONS

Japanese Patent Laid-Open Specification No. Sho 49-102092, 9-26-74.
Japanese Utility Model Laid-Open Specification No. Sho 60-169068, 11-9-85.

Primary Examiner—Daniel P. Stodola
Assistant Examiner—William G. Battista, Jr.
Attorney, Agent, or Firm—Townsend & Townsend

[57] ABSTRACT

A hydraulic reaction force apparatus of a power steering device includes an input shaft, an output shaft, the input and output shafts being connected with each other to be pivotal through a predetermined angle, reaction force arms connected integrally with the input shaft and projecting radially therefrom, a pair of output shaft guide holes sandwiching each reaction force arm and disposed to oppose each other in a direction perpendicular to the reaction force arms, reaction force plungers slidably disposed in the guide holes, and a reaction force mechanism for biasing the reaction force plungers against the reaction force arms by a reaction force applied to the reaction plungers and related to running conditions. Each reaction force plunger includes a metal cylindrical member having a hollow portion open at a side opposite to that of the reaction force arms and a damping member mounted in the cylindrical member.

9 Claims, 4 Drawing Sheets

HYDRAULIC REACTION FORCE APPARATUS OF POWER STEERING DEVICE

This is a continuation of Ser. No. 07/062,008, filed June 12, 1987, now abandoned.

BACKGROUND OF THE INVENTION

The present invention relates to an improvement in a hydraulic reaction force apparatus in a power steering device, for obtaining a proper steering force corresponding to various running conditions of a vehicle, such as a vehicle speed and a steering angle.

In a power steering device for reducing a steering wheel operating force (steering force) of a vehicle, an operation of the device must be properly controlled in accordance with various running conditions of a vehicle, such as a steering force and a steering angle corresponding to a steering operation of a driver, and a vehicle speed, thereby obtaining an auxiliary steering force. That is, a large auxiliary steering force must be output to require an extremely small steering force of the operator during the steering operation performed when a vehicle is parked or running at a low speed. On the other hand, when a vehicle is running at a high speed, such a large auxiliary steering force reduces the steering force too much. Then, the driver feels uneasy, and hence this is not preferable to allow safe and comfortable driving. Therefore, in this case, the auxiliary steering force must be reduced to make a steering wheel heavier, i.e., to increase the steering force, thereby obtaining stability during straight running of a vehicle. Such steering force control is similarly required as a steering angle is increased.

In order to satisfy the above requirement, a number of hydraulic reaction force apparatuses having various arrangements have been conventionally proposed. In these apparatuses, a proper rigidity (steering reaction force) is given to a steering wheel by a reaction force hydraulic pressure controlled in accordance with various running conditions of a vehicle, thereby controlling a steering force when a vehicle runs at high and low speeds and under various other conditions. More specifically, in a hydraulic reaction force apparatus of this type disclosed in Japanese Patent Prepublication (Kokai) No. 49-102092 and Japanese Utility Model Prepublication (Kokai) No. 60-169068, reaction force arms project at the input shaft side of a rotary control valve for switching flow paths, a pair of reaction force plungers are provided at the output shaft side thereof for each arm to move forward and backward from both sides along a rotation direction of the arm, and a hydraulic reaction force chamber is formed at the outer ends of the plungers. A reaction force hydraulic pressure is applied into the hydraulic reaction force chamber to drive the plungers in accordance with a vehicle speed, and a predetermined restriction force is applied on the input shaft through the arms, thereby obtaining a proper steering reaction force to facilitate the steering operation corresponding to various running conditions of the vehicle.

In the hydraulic reaction force apparatus having the above arrangement, the reaction plungers are slidably held in guide holes formed at the output shaft side, and the plungers are moved in a desired direction by a differential pressure before and after themselves (a pressure difference between the arms and the hydraulic reaction force chamber). The outer ends of the plungers strike against retainers provided as stoppers at the outer ends of the guide holes, and the inner ends thereof strike against locking step portions at the output shaft side facing the inner ends of the guide holes or the reaction force arms at the input shaft side. In this case, an impact sound is generated between metal members, thus posing a noise problem.

Especially, the impact sound generated when the plungers strike against the retainers as stoppers is generated because a return pressure is abruptly increased due to an impulsive input such as kickback from a tire, and hence is a large sound. Therefore, a countermeasure is required to absorb or reduce the above impact sound. It is a matter of course that such a problem is not posed in a hydraulic reaction force apparatus of a type in which the plungers are biased toward the arms by springs, since the impact sound is absorbed by the biasing force. However, the plungers strike against the arms or the locking step portions by the spring reaction force to generate a large impact sound. Therefore, such a problem must be taken into consideration again in this apparatus.

In order to prevent the impact sound generated between the plungers and retainers, a buffer member such as rubber may be adhered on a contacting portion of each retainer opposing the corresponding plunger. However, in this arrangement, durability or a proper absorbing effect of kinetic energy with respect to the repeatedly applied impulsive force poses another problem. In addition, a problem of an impact sound generated by the arms or the locking step portions at the opposite side remains unsolved. Therefore, some countermeasures must be taken in consideration of the above situation.

SUMMARY OF THE INVENTION

It is, therefore, a principal object of the present invention to provide a hydraulic reaction force apparatus of a power steering device, which is capable of preventing an impact sound generated between reaction force plungers and stoppers by damping members mounted inside hollow portions of the reaction force plungers, capable of reducing an impact sound generated between the reaction force plungers and reaction force arms or locking step portions by a damping function of the hollow plungers and the damping members mounted therein, and if annular damping members are mounted, capable of properly preventing the impact sound generated between the reaction force plungers and the locking step portions.

In order to achieve the above object, there is provided a hydraulic reaction force apparatus of a power steering device, comprising: an input shaft; an output shaft, the input and output shafts being connected with each other to be pivotal through a predetermined angle; reaction force arms, connected integrally with the input shaft, and projecting radially therefrom; a pair of output shaft guide holes, sandwiching each reaction force arm, and disposed to oppose each other in a direction perpendicular to the reaction force arms; reaction force plungers slidably disposed in the guide holes; and a reaction force mechanism for biasing the reaction force plungers against the reaction force arms by a reaction force, applied to the reaction force plungers, and related to running conditions, wherein each of the reaction force plungers comprises: a metal cylindrical member having a hollow portion open at a side opposite to that of the reaction force arms; and a damping member mounted in the cylindrical member.

DETAILED DESCRIPTION OF THE PREFERRED EMBODIMENTS

The present invention will be described in detail with reference to embodiments shown in the accompanying drawings.

Figure 1:
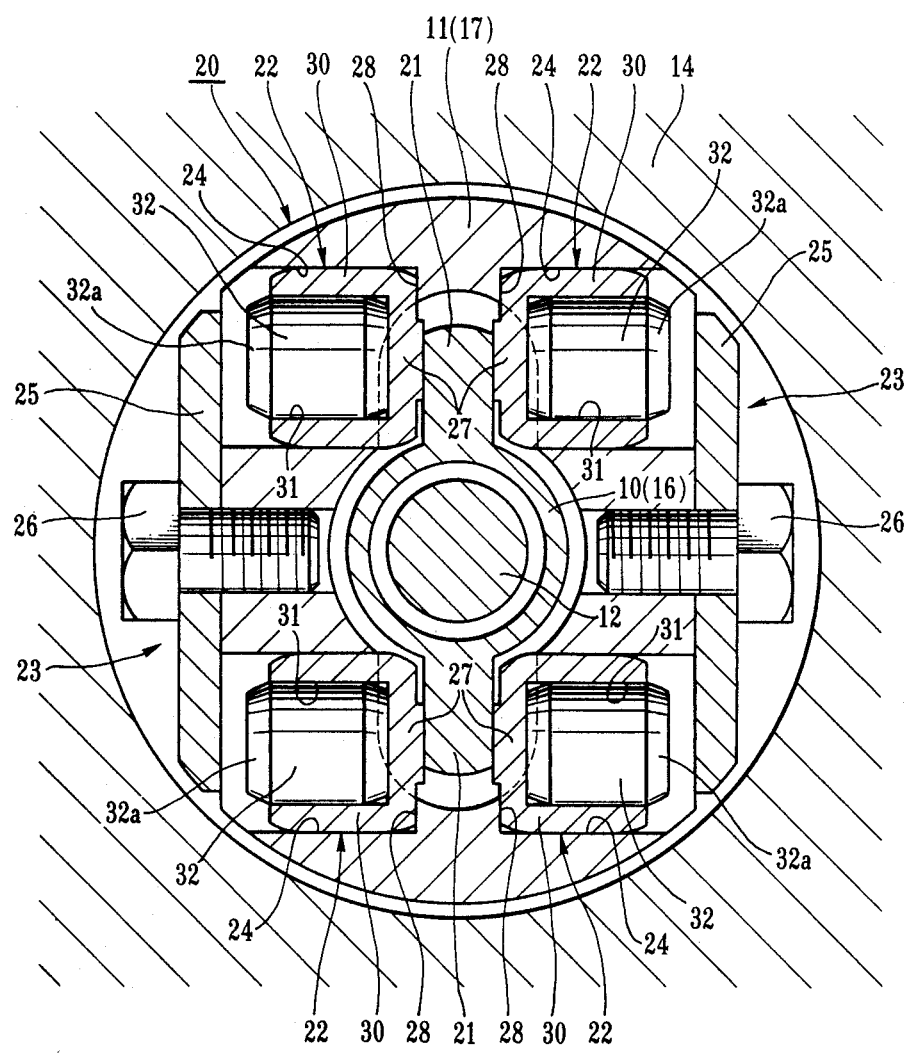
FIG. 1 is an enlarged cross-sectional view showing a main part of an embodiment of a hydraulic reaction force apparatus of a power steering device according to the present invention.
Figure 2:
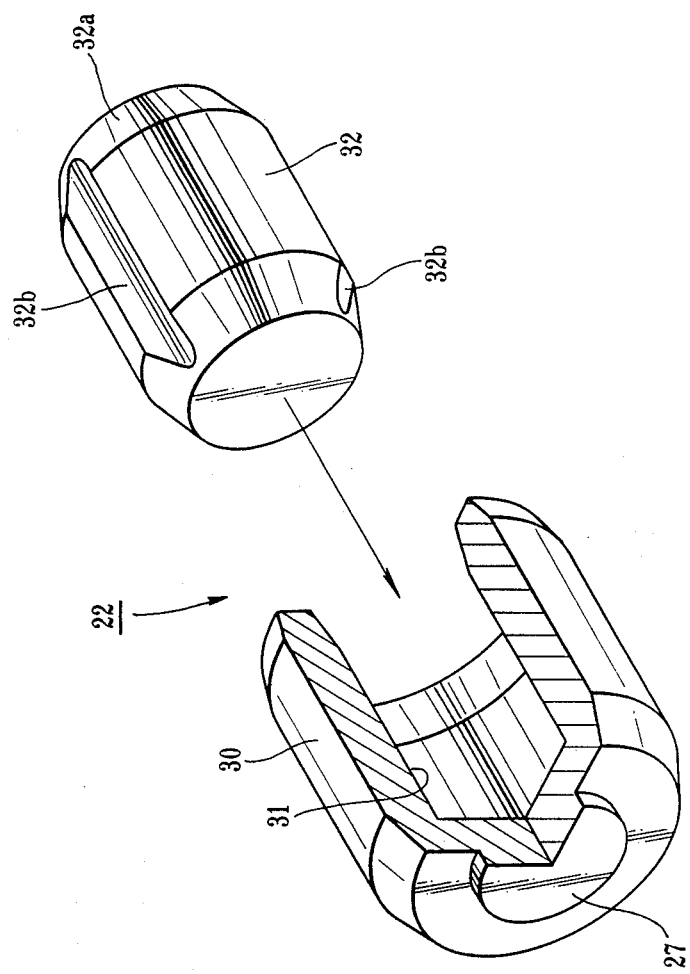
FIG. 2 is an exploded perspective view showing a reaction force plunger which is a characteristic feature of the present invention.
Figure 3:
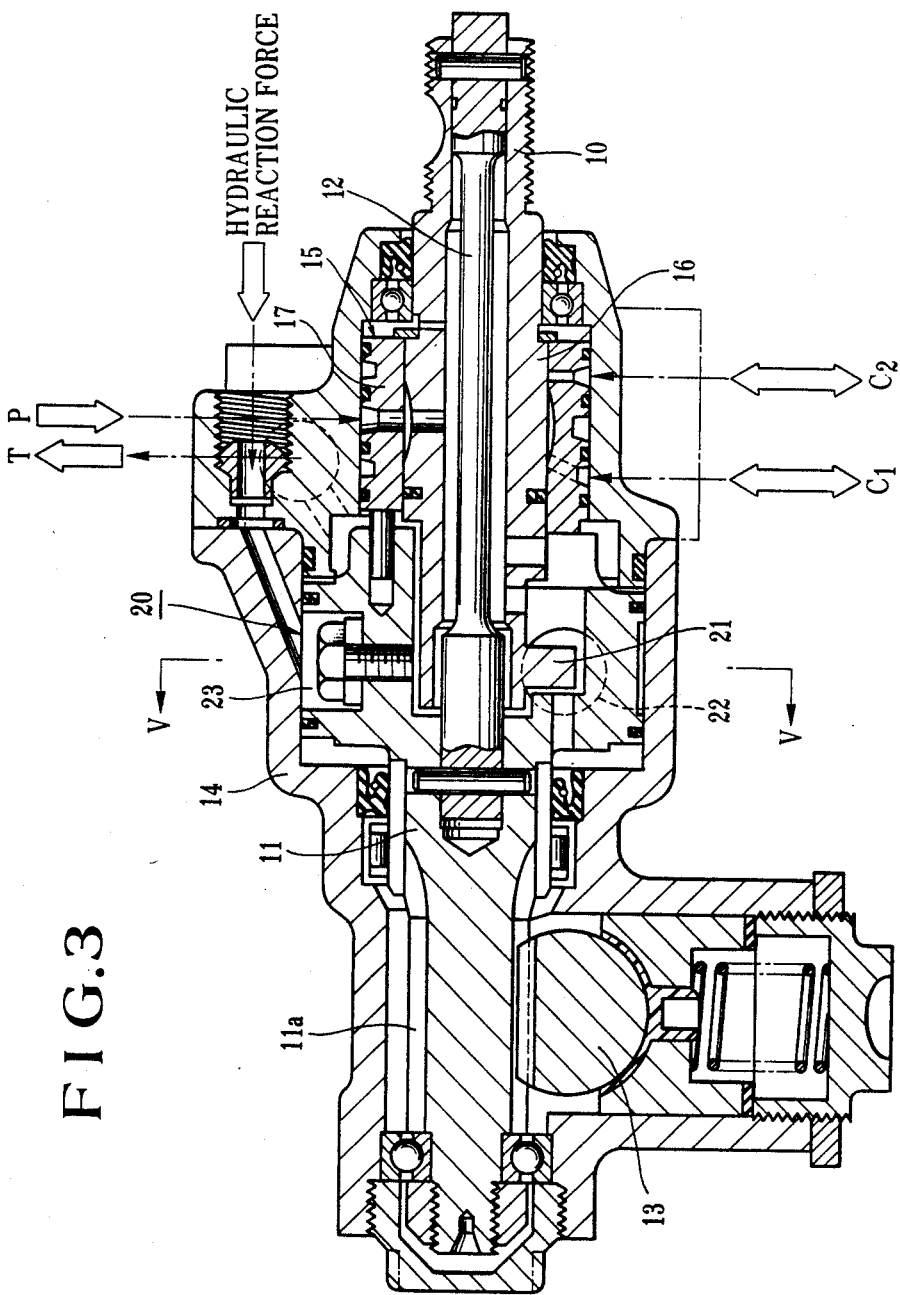
FIG. 3 is a schematic cross-sectional view showing the entire power steering device to which the present invention is applied.

FIGS. 1 to 3 show an embodiment of a hydraulic reaction force apparatus of a power steering device according to the present invention. First, a schematic arrangement of a power steering main body of the power steering device will be described briefly with reference to FIG. 3. In FIG. 3, reference numeral 10 denotes an input shaft (stub shaft) coupled to a steering wheel (not shown), and reference numeral 11 denotes an output shaft (pinion shaft) coupled to the left end of the input shaft 10 through a torsion bar 12. The output shaft 11 has a pinion 11a meshing with a rack 13 which constitutes a steering link mechanism (not shown). Both the shafts 10 and 11 are rotated in their steering directions as needed. In a body 14 constituting the power steering main body, a rotor 16 and a sleeve 17 constituting a rotary flow path switching valve 15 are formed integrally with the shafts 10 and 11, respectively. Flow paths are switched between an oil pump P and an oil tank T, and left and right cylinder chambers C1 and C2 of a power cylinder (all of which are not shown) by relative rotational displacement between the rotor 16 and the sleeve 17. Note that an arrangement and an operation of such a rotary flow path switching valve 15 is conventionally known, and a detailed description thereof will be omitted.

Reference numeral 20 denotes a hydraulic reaction force apparatus provided between the input and output shafts 10 and 11 integral with the rotor 16 and the sleeve 17 which constitute the flow path switching valve 15. As is apparent from FIG. 1, a hydraulic reaction force apparatus 20 is constituted by two reaction force arms 21 projecting radially from positions opposing each other at the outer periphery of the input shaft 10, two pairs of plungers 22, each pair being slidably supported at the output shaft 11 side so as to be located at both sides along a rotation direction of the corresponding arm 21, and a hydraulic reaction force chamber 23 formed outside the plungers 22 and between the plungers 22 and the body 14. By a reaction force hydraulic pressure supplied to the hydraulic reaction force chamber 23 in accordance with various running conditions of a vehicle such as a vehicle speed, a predetermined restriction force is applied on the reaction arms 21 by the plungers 22, thereby restricting a relative rotation state between the input and output shafts 10 and 11. As a result, a required steering reaction force can be obtained to perform proper steering force control.

Reference numerals 24 denote guide holes for slidably holding the plungers 22 at the arm 21 sides; 25, retainers as stoppers, facing the outer ends of the guide holes, for locking the rear ends (outer ends) of the plungers 22; and 26, set screws for fixing the retainers. Small-diameter projections 27 project integrally from the inner end faces as contacting sides of the plungers 22 with respect to the arms 21 so as to adjust any play between the input and output shafts 10 and 11 in a neutral state, thereby obtaining a proper and reliable contacting state with respect to the arms 21. Reference numerals 28 denote locking step portions, formed in the guide holes 24 to face the inner ends thereof, for regulating movement of the plungers 22. In addition, a fail-safe mechanism (not shown) is provided between the input and output shafts 10 and 11. The fail-safe mechanism is pivoted over a predetermined angle to abut against the shafts 10 and 11, thereby connecting them to each other.

According to the characteristic feature of the present invention, in the hydraulic reaction force apparatus 20 having the above arrangement, each of the reaction force plungers 22, which is slidably supported in the guide hole 24 at the output shaft 11, the outer end of which is locked by the retainer 25 as a stopper, and which applies the restriction force on the reaction force arm 21 at the input shaft 10 in the rotation direction by the reaction force hydraulic pressure, is constituted by a metal cylindrical member 30 having a hollow portion 31 open at least at the outer end side, and a substantially columnar damping member 32 which is inserted in the cylindrical member 30 under pressure and a portion 32a of which projects toward the outer end and is selectively locked by the stopper 25.

More specifically, as is apparent from FIGS. 1 and 2, the reaction force plunger 22 which is a characteristic feature of the present invention includes the metal cylindrical member 30 having a substantially cylindrical shape with a bottom, and the damping member 32 having a substantially columnar shape and formed longer than an axial dimension of the hollow portion 31 of the metal cylindrical member 30 by a predetermined length. The damping member 32 is inserted inside the hollow portion 31 of the cylindrical member 30 to be fixed therein. In consideration of durability and the like, the damping member 32 is preferably formed by a rubber material having a hardness of about Hs80 to 95 (such as nitrile rubber, urethane, thermoplastic elastomer, and hydrogenated nitrile rubber). At the outer periphery of the damping member 32, axial slits 32b are formed to be parallel to an axis thereof at a plurality of positions at equal intervals along the circumferential direction so as to exhaust air from the bottom of the damping member 32 when the damping member 32 is inserted in the hollow portion 31 of the metal cylindrical member 30. It is a matter of course that instead of the slits 32b, small axial holes may be formed in the damping member 32. With the damping member 32 having the slits 32b (small holes), oil in the hydraulic reaction force chamber 23 is guided to a chamferred portion at the bottom of the hollow portion 31 when the damping member 32 is mounted in the cylindrical member 30. Thus, the entire damping member 32 can receive a reaction force hydraulic pressure. As a result, a local excessive load can be prevented, thereby advantageously obtaining a good mechanical strength. A gap between the slits 32b and the chamferred portion as described above also functions as a relief space by elastic deformation of the damping member 32 when the plunger 22 strikes against the retainer 25, thereby advantageously eliminating generation of an excessive stress. Note that in order to assure the above advantages, the damping member 32 may be generally formed by a rubber material or the like having incompressibility, and its volume may be smaller than that of the hollow portion 31 of the plunger cylindrical member 30. In this case, elastic fatigue of the damping member 32 can be reduced.

According to the above arrangement, a damping member (32) projecting at the outer end of the plunger 22 is caused to strike against the retainer 25 as a stopper when the plunger 22 moves backward. Therefore, the impact sound generated between the metal members can be prevented, i.e., generation of noise can be reduced. This can be easily understood from the fact that even if a large force acts on the plunger 22 and the end face of the metal cylindrical member 30 of the plunger 22 strikes against the retainer 25, a kinetic energy of the plunger 22 is absorbed by the damping member 32 of a rubber material to eliminate an abrupt impact, thereby reducing an impact sound. Especially, according to the columnar damping member 32, less strain is generated along the axial direction. Therefore, it is obvious that the damping member 32 is advantageous in terms of durability with respect to a repeated load.

In addition, according to the plunger 22, since a mass of the metal cylindrical member 30 as a main body is small and the damping member 32 of a rubber material is embedded therein, a damping function of the plunger itself is improved. Therefore, an impact sound generated when the plunger 22 strikes against the arm 21 or the locking step portion 28 at the output shaft 11 side can also be reduced.

Figure 4:
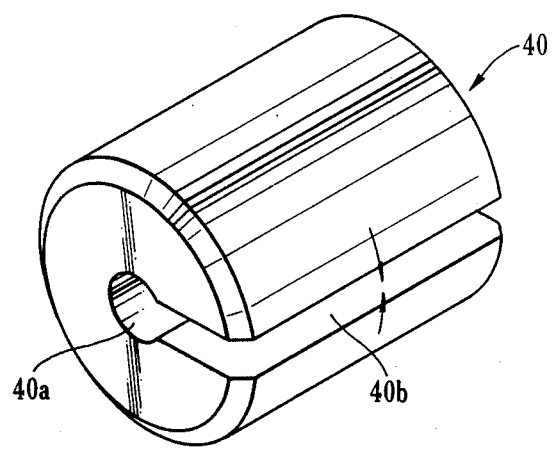
FIGS. 4 to 6 are views for explaining another embodiment of the present invention.

Note that in this embodiment, a description has been made with reference to the case wherein the columnar damping member 32 is made of a rubber material such as nitrile rubber and is inserted in the hollow portion 31 of the metal cylindrical member 30 under pressure. However, the present invention is not limited to this embodiment. For example, the damping member 32 may be made of other rubber materials or by various elastic materials such as synthetic resin, and may be mounted by baking, adhesion, and the like in addition to insertion under pressure. It is a matter of course that the damping member 32 may be slidably held in the plunger 22. For example, FIG. 4 shows the case wherein a damping member 40 is formed by a synthetic resin material such as acetal resin. In FIG. 4, reference numeral 40a denotes a central hole open parallel to an axis of the guide hole; and 40b, a slit formed on an outer periphery of the damping member to be parallel to an axis thereof and radial to the central hole 40a. Tension force of such a resin material is reduced during insertion because of relaxation at a high temperature of 100° C. or more. For this reason, the slit 40b must be formed to, prevent an increase in strain stress during insertion, so that the damping member 40 is always held in the cylindrical member by a proper repulsive force. For this purpose, an outer diameter of the damping member 40 is set larger than an inner diameter of the cylindrical member.

In addition, when the damping member 32 or the like is fixed in the hollow portion 31 of the metal cylindrical member 30 by baking or adhesion, a countermeasure is required to prevent local stress concentration caused by repeated load. Therefore, a contacting portion may be formed to be an arcuated surface to facilitate stress dispersion.

Figure 5:
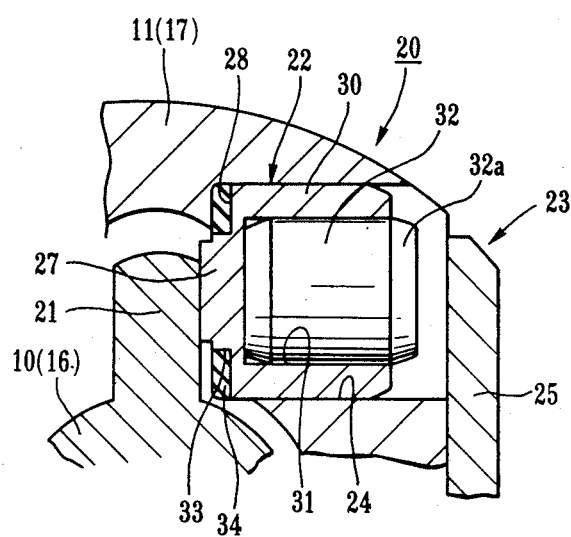

FIG. 5 shows another embodiment of the present invention, in which a small-diameter portion 33 is formed at an inner end outer periphery of the metal cylindrical member 30 which constitutes the plunger 22, and an annular damping member 34 made of, e.g., a rubber material like the columnar damping member 32 described above is fitted on the small-diameter portion 33. With the above arrangement, in addition to the function for reducing the impact sound generated between the plunger 22 and the retainer 25, the arm 21, and the locking step portion 28, an effect for reducing the impact sound generated at the locking step portion 28 can also be achieved.

The material for the annular damping member 40 is not limited to that for the columnar damping member 32, but may be selected as needed. In addition, integral formation, fitting, and the like may be adapted as a fixing method therefor as needed.

Figure 6:
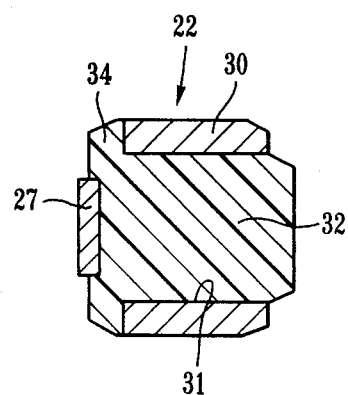

Furthermore, it can be easily understood that as shown in FIG. 6, the annular damping member 34 and the columnar damping member 32 may be formed integrally with each other by a synthetic resin material. In this case, the damping member in the cylindrical member 30 is guided outside through a hole opened on a surface opposite to the reaction force arm 21 of the cylindrical member 30.

Note that the present invention is not limited to the above embodiments, but a shape, a structure, and the like of the respective parts of the power steering device may be freely changed or modified.

As has been described above, in the hydraulic reaction force apparatus of the power steering device according to the present invention, the reaction force plunger is constituted by the metal cylindrical member having the hollow portion open at the outer end, and the damping member, mounted in the cylindrical member with part thereof projecting from the rear end opening, and selectively abutting against the stopper, a small-diameter portion is selectively formed at the inner end outer periphery of the metal cylindrical member which constitutes the plunger, and the annular damping member selectively abutting against the locking step portion at the output shaft side is fitted on the small-diameter portion. Therefore, inspite of a simple and inexpensive arrangement, an impact sound generated between the reaction force plunger and the stopper can be prevented by the damping member mounted in the hollow portion of the reaction force plunger, and an impact sound generated between the reaction force plunger and the reaction force arm or the locking step portion can be reduced by a damping function of the hollow plunger and the damping member mounted therein. In addition, an impact sound generated between the reaction force plunger and the locking step portion can be properly prevented by mounting the annular damping member.

What is claimed is:
1. A hydraulic reaction force apparatus of a power steering device, comprising:
   an input shaft;
   an output shaft;
   means for providing direct torsional coupling between said input shaft and said output shaft; and
   means for providing a variable drag force in opposition to said direct torsional coupling means, said drag force means including:

reaction force arms, connected integrally with said input shaft, and projecting radially therefrom;

a pair of output shaft guide holes, sandwiching each of said reaction force arms, and oppositely disposed to each other in a direction perpendicular to said reaction force arms;

a plurality of reaction force plungers each slidably disposed in a corresponding different one of said guide holes; and means for providing a hydraulic force for biasing said reaction force plungers against said reaction force arms to oppose relative rotation between said output shaft and said input shaft;

each of said reaction force plungers comprising a metal cylindrical member having a hollow portion open at a side opposite to that of said reaction force arms; and a damping member carried by said cylindrical member, said damping member having an inner end, an outer end and means for exposing said inner end and said outer end to said hydraulic force.

2. An apparatus according to claim 1, further comprising:

a stopper, disposed to oppose said damping member, for regulating movement thereof.

3. An apparatus according to claim 1, wherein said cylindrical member has a projection formed at an outer surface central portion opposing a corresponding one of said reaction force arms.

4. An apparatus according to claim 1, wherein said damping member includes a portion disposed on the surface of said cylindrical member opposing a corresponding one of said reaction force arms.

5. An apparatus according to claim 1, wherein step portions are provided in said output shaft guide holes to regulate movement of said reaction force plungers toward said reaction force arms.

6. An apparatus according to claim 5, wherein said damping member has a surface formed to oppose a corresponding one of said reaction force arms and to contact a corresponding one of said step portions through a hole open at a side of said cylindrical member opposing the corresponding one of said reaction force arms.

7. An apparatus according to claim 1, wherein said exposing means includes a through hole formed in said damping member and extending in a direction parallel to an axis of a corresponding one of said guide holes.

8. The apparatus of claim 7 wherein said damping member further includes an axially extending slot opening into said through hole.

9. An apparatus according to claim 1, wherein said exposing means includes a groove formed on an outer periphery of said damping member and extending in a direction parallel to the body axis thereof.

* * * * *